Jan. 25, 1944.  H. W. ROMANOFF  2,339,880
WIRE CUTTER
Filed Jan. 23, 1943   2 Sheets-Sheet 1
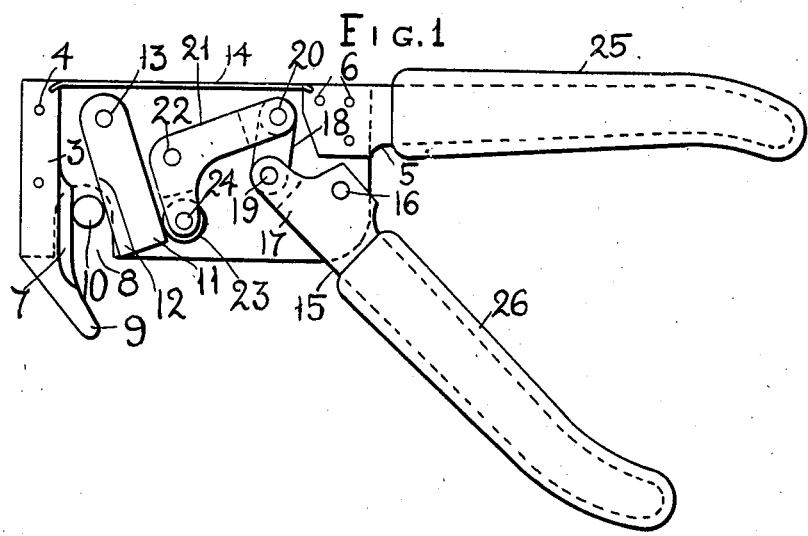
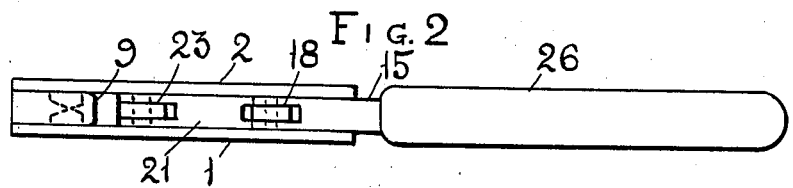
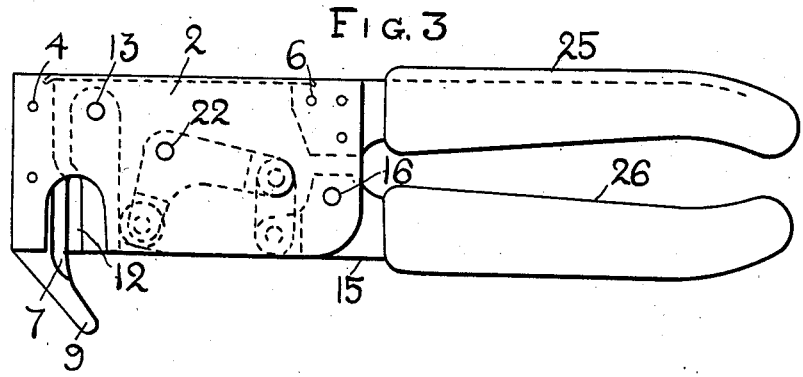
HIPPOLYTE W. ROMANOFF
INVENTOR
BY
John P. Nironow
ATTORNEY

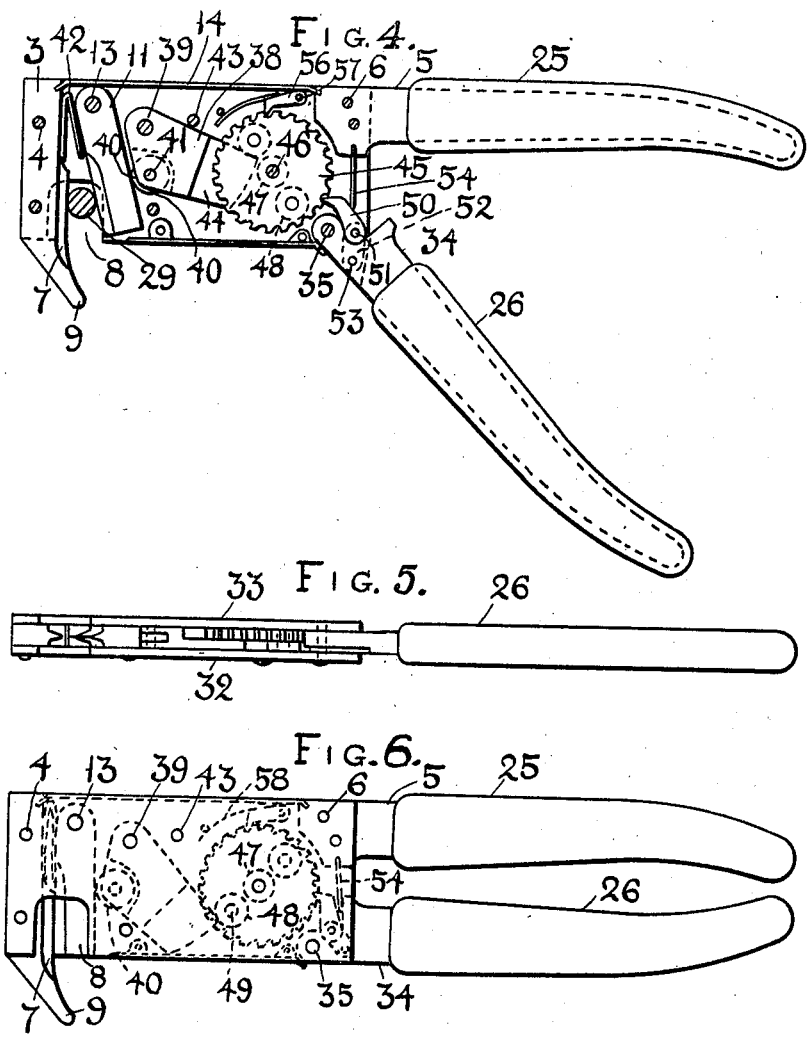

Patented Jan. 25, 1944

2,339,880

UNITED STATES PATENT OFFICE 2,339,880

WIRE CUTTER

Hippolyte W. Romanoff, New York, N. Y.

Application January 23, 1943, Serial No. 473,287

11 Claims. (Cl. 30—187)

My invention relates to wire cutters and has particular reference to portable cutters for cutting relatively heavy wire.

In my patent application, Serial No. 390,232, filed April 25, 1941, now Patent No. 2,311,695, patented February 23, 1943, and application Serial No. 440,512, filed April 25, 1942, I disclosed cutters for cutting steel wire as is used for wire entanglements, barbed wire fences, etc., and suitable for cutting wire up to about 7/16 in. in diameter. For heavier wire, such as ¼ in. and even 5/16 in. in diameter, these cutters are not entirely suitable because with a large opening of the jaws the angle between the cutting edge becomes so large that the wire may be forced out of the jaws before it is cut.

My invention has for its object to provide a cutter which can be used for relatively heavy wire. I provide my cutter for this purpose with a long movable jaw so pivoted that the jaws can be opened to admit a heavy wire while remaining at a relatively small angle to each other so that the wire will not be forced out while being cut. I also provide additional levers between the handles of the cutter and its jaws for increasing the force exerted by the jaws on the wire.

In a modified type of my cutter, specially designed for a heavy wire, the movable handle operates a ratchet for closing the jaws, a very large force being thereby developed for cutting heavy and strong wire.

My invention is more fully described in the accompanying specifications and drawings, in which:

Fig. 1 is a side view of my cutter with the jaws fully opened;

Fig. 2 is an edge view of the same;

Fig. 3 is a side view of the cutter with the jaws closed;

Fig. 4 is a sectional side view of a modified cutter specially adapted for cutting still heavier wire, shown with the jaws fully opened;

Fig. 5 is a sectional edge view of the same; and

Fig. 6 is a side view of the cutter with the jaws closed.

My wire cutter as shown in Figs. 1, 2 and 3, consists of a frame formed of two plates 1 and 2 spaced apart and fastened at the front to the sides of a stationary jaw 3 by screws 4, and at the rear to the end of a stationary handle 5 by rivets 6. The jaw has a cutting edge 7 positioned in an opening 8 provided by corresponding slots in the edges of the plates 1 and 2. The jaw has an extension or hook 9 for engaging a wire 10 and sliding the same into the opening 8.

A movable jaw 11 is provided with a cutting edge 12 at one end positioned in the opening 8, the other end having a hole for a pivot 13. The latter may be of any suitable construction but I prefer to make it as a pin screw threaded into the plate 2. The pivoted end is rounded and is placed close to a strip 14, forming a dust shield and fitted at the edges into corresponding slots in the side plates 1 and 2, the ends of the strip being fitted into corresponding slots in the end of the handle 5 and in the end of the stationary jaw 3. The strip can be removed by removing the stationary jaw and sliding the strip endwise outward.

A movable handle 15 is pivotally supported on a pin 16 fitted in the plates 1 and 2. The handle has a short extension 17 at the front with a slot for a link 18, held by a pivot 19. The other end of the link is held by a pivot 20 in a slot in the rear end of a lever 21. The latter is pivoted on a pin 22 held in the plates 1 and 2. The other and shorter end of the lever has a slot for a roller 23 supported on a pin 24. The roller bears against the rear edge of the movable jaw. The point of pressure of the roller is so selected that an added leverage is obtained, the distance between the pivots 13 and 24 being greater than the distance between the pivot 13 and the wire 10. The cutting force is thereby materially increased, there being three levers between the handle and the point of application of the cutting force.

The handles may be provided with jackets 25 and 26, preferably made of a suitable plastic material or insulation so that the cutter can be used to cut an electrically charged wire.

Another type of my cutter is shown in Figs. 4, 5 and 6. This cutter is specially designed for cutting a heavy wire and has jaws which can be opened wide for wire of a large diameter, the angle between the jaws remaining relatively small, however, so that the wire has no tendency to slide out from the jaws under cutting pressure.

The cutter, as in my other models, has a stationary jaw 3 fastened between side plates 32 and 33 forming a frame of the cutter. A rear handle 5 is fastened at the rear end of the frame between the plates by rivets 6, a movable handle 34 being rotatively mounted on a pivot 35. The handles have insulation jackets 25 and 26.

The plates have slots 8 at the sides, forming an opening for a wire 29. A hook 9 on the stationary jaw is used to bring the wire into the opening where it is cut by cutting edges 7 and 12 on the stationary jaw 3 and movable jaw 11, respectively. The movable jaw is mounted on a pivot 13, extending transversely across the width of the frame and it is therefore relatively long so that the angle between the jaws, when fully opened, is small.

The movable jaw is operated by a lever 38 pivotally supported on a pin 39 and having a roller 40 on a pin 41, the roller engaging the rear edge of the movable jaw. A spring 42 is placed between the jaws for moving the movable jaws away from the stationary jaw, a pin 43 limiting the opening movement of the movable jaw.

The rear end 44 of the lever 38 is of reduced thickness and passes under a ratchet wheel 45 mounted on a pin 46 with a spacer 47 for raising the wheel above the plate 32. Rollers 48 are mounted on the under side of the wheel on pins 49 diametrically opposite each other. One of the rollers engages the outer edge of the arm 44 of the lever as shown in Fig. 7 for rotating the lever when the wheel is rotated by a pawl 50 pivotally mounted on the movable handle. The rear end of the pawl is fitted in a corresponding recess in the inner or front end of the movable handle and is mounted on a pin 51 supported on a bar 52 fastened to the handle by a rivet 53. A flat spring 54 is fastened at one end in a slot in the stationary handle 5, the free end of the spring pressing against the pawl 50, urging it against the teeth 55 of the wheel. A similar pawl 56 is mounted on a pin 57 and is pressed by a spring 58 against the wheel for holding the latter when the pawl 50 is moved to the left by opening the handle.

The leverage ratios of the handle and pawl, also of the arms of the lever 38, are so proportioned that the full movement of the handle is sufficient to advance the movable jaw a fraction of its full travel so that several movements or strokes of the handle are necessary for the complete movement of the jaw or for cutting the wire 29. Great force therefore can be developed at the jaws with relatively small effort at the handles.

It is understood that my cutter may be further modified without departing from the spirit of the invention, as set forth in the appended claims.

I claim as my invention:

1. A wire cutter comprising a frame formed of two metal plates spaced apart; a stationary cutting jaw fastened between the plates at the front end of the frame, the frames having a slot at the side for the jaw for admitting a piece of wire to be cut; a movable cutting jaw disposed in an approximately parallel relation to the stationary jaw and having an elongated shank extending transversely of the frame; a pivot supporting the end of the shank between the plates; a lever rotatively supported between the plates; a stationary handle extending from the rear end of frame; a movable handle pivotally supported between the plates having a short inner end; and operative connections between the inner end of the movable handle and one end of the lever, the other end of the lever engaging the movable jaw for moving the same toward the stationary jaw when the movable handle is moved toward the stationary handle.

2. A wire cutter comprising a frame formed of two metal plates spaced apart; a stationary cutting jaw fastened between the plates at the front end of the frame, the frames having a slot at the side for the jaw for admitting a piece of wire to be cut; a movable cutting jaw disposed in an approximately parallel relation to the stationary jaw and having an elongated shank extending transversely of the frame; a pivot supporting the end of the shank between the plates; a lever rotatively supported between the plates; a stationary handle extending from the rear end of the frame; a movable handle pivotally supported between the plates having a short inner end; and operative connections between the inner end of the movable handle and one end of the lever, the other end of the lever slidably engaging the movable jaw for moving the same toward the stationary jaw when the movable handle is moved toward the stationary handle.

3. A wire cutter comprising a frame formed of two metal plates spaced apart; a stationary cutting jaw fastened between the plates at the front end of the frame, the frames having a slot at the side for the jaw for admitting a piece of wire to be cut; a movable cutting jaw disposed in an approximately parallel relation to the stationary jaw and having an elongated shank extending transversely of the frame; a pivot supporting the end of the shank between the plates; a lever rotatively supported between the plates; a stationary handle extending from the rear end of frame; a movable handle pivotally supported between the plates having a short inner end; and operative connections between the inner end of the movable handle and one end of the lever, and a roller at the front end of the lever slidably engaging the rear side of the movable jaw for moving same toward the stationary jaw when the movable handle is moved toward the stationary handle.

4. A wire cutter comprising a frame formed of two metal plates spaced apart; a stationary cutting jaw fastened between the plates at the front end of the frame, the frames having a slot at the side for the jaw for admitting a piece of wire to be cut; a movable cutting jaw disposed in an approximately parallel relation to the stationary jaw and having an elongated shank extending transversely of the frame; a pivot supporting the end of the shank between the plates; a stationary handle extending from the rear end of the frame; a movable handle pivotally supported between the plates having a short inner end; and operative connections between the inner end of the movable handle and the movable jaw for moving the same toward the stationary jaw when the movable handle is moved toward the stationary handle, the operative connections including a member slidably engaging the rear side of the movable jaw, and so positioned as to increase the leverage of the movable jaw at the beginning of the cutting operation.

5. A wire cutter comprising a frame formed of two metal plates spaced apart; a stationary cutting jaw fastened between the plates at the front end of the frame, the frames having a slot at the side for the jaw for admitting a piece of wire to be cut; a movable cutting jaw disposed in an approximately parallel relation to the stationary jaw and having an elongated shank extending transversely of the frame; a pivot supporting the end of the shank between the plates; a lever rotatively supported between the plates; a stationary handle extending from the rear end of frame; a movable handle pivotally supported between the plates having a short inner end; operative connections between the inner end of the movable handle and one end of the lever, the other end of the lever engaging the movable jaw for moving the same toward the stationary jaw when the movable handle is moved toward the stationary handle; and a bar removably fitted between the edge portions of the plates for closing the space between the plates.

6. A wire cutter comprising a frame formed of two metal plates spaced apart; a stationary cutting jaw fastened between the plates at the front end of the frame, the frames having a slot at the side for the jaw for admitting a piece of wire to be cut; a movable cutting jaw disposed in an approximately parallel relation to the stationary jaw and having an elongated shank extending transversely of the frame; a pivot supporting the end of the shank between the plates; a lever rotatively supported between the plates; a stationary handle extending from the rear end of frame; a movable handle pivotally supported between the plates having a short inner end; operative connections between the inner end of the movable handle and one end of the lever, the other end of the lever engaging the movable jaw for moving the same toward the stationary jaw when the movable handle is moved toward the stationary handle; and a bar removably fitted between the edge portions of the plates for closing the space between the plates, the movable jaw being adapted to be removed without disturbing the position of the bar.

7. A wire cutter comprising a frame formed of two metal plates spaced apart; a stationary cutting jaw fastened between the plates at the front end of the frame, the frames having a slot at the side for the jaw for admitting a piece of wire to be cut; a movable cutting jaw disposed in an approximately parallel relation to the stationary jaw and having an elongated shank extending transversely of the frame; a pivot supporting the end of the shank between the plates; a lever rotatively supported between the plates; a stationary handle extending from the rear end of frame; a movable handle pivotally supported between the plates having a short inner end; a ratchet wheel rotatively supported between the plates; means to rotate the ratchet wheel by the movable handle; and means to turn the lever by the ratchet wheel for cutting the wire.

8. A wire cutter comprising a frame formed of two metal plates spaced apart; a stationary cutting jaw fastened between the plates at the front end of the frame, the frames having a slot at the side for the jaw for admitting a piece of wire to be cut; a movable cutting jaw disposed in an approximately parallel relation to the stationary jaw and having an elongated shank extending transversely of the frame; a pivot supporting the end of the shank between the plates; a lever rotatively supported between the plates; a stationary handle extending from the rear end of frame; a movable handle pivotally supported between the plates having a short inner end, a ratchet wheel rotatively supported between the plates; means to rotate the ratchet wheel by the movable handle; and means to turn the lever by the ratchet wheel for cutting the wire while making several movements of the handle.

9. A wire cutter comprising a frame formed of two metal plates spaced apart; a stationary cutting jaw fastened between the plates at the front end of the frame, the frames having a slot at the side for the jaw for admitting a piece of wire to be cut; a movable cutting jaw disposed in an approximately parallel relation to the stationary jaw and having an elongated shank extending transversely of the frame; a pivot supporting the end of the shank between the plates; a lever rotatively supported between the plates; a stationary handle extending from the rear end of the frame; a movable handle pivotally supported between the plates having a short inner end; and operative connections between the inner end of the movable handle and one end of the lever for causing the movable jaw to complete its operating movement when the handles make several complete movements.

10. A wire cutter comprising a frame formed of two metal plates spaced apart; a stationary cutting jaw fastened between the plates at the front end of the frame; the frames having a slot at the side for the jaw for admitting a piece of wire to be cut; a movable cutting jaw disposed in an approximately parallel relation to the stationary jaw and having an elongated shank extending transversely of the frame; a pivot supporting the end of the shank between the plates; a lever rotatively supported between the plates; a stationary handle extending from the rear end of the frame; a movable handle pivotally supported between the plates having a short inner end, a ratchet wheel rotatively supported between the plates; means to rotate the ratchet wheel by the movable handle; means to turn the lever by the ratchet wheel for cutting the wire; and retrieving spring for moving the movable jaw away from the stationary jaw.

11. A wire cutter comprising a frame formed of two metal plates spaced apart; a stationary cutting jaw fastened between the plates at the front end of the frame, the frames having a slot at the side for the jaw for admitting a piece of wire to be cut; a movable cutting jaw disposed in an approximately parallel relation to the stationary jaw and having an elongated shank extending transversely of the frame; a pivot supporting the end of the shank between the plates; a lever rotatively supported between the plates; a stationary handle extending from the rear end of frame; a movable handle pivotally supported between the plates having a short inner end; a ratchet wheel rotatively supported between the plates; means to rotate the ratchet wheel by the movable handle; and rollers on the ratchet wheel engaging the lever for rotating the latter until the jaws meet together, the rollers being adapted to release the lever upon completion of the cutting stroke.

HIPPOLYTE W. ROMANOFF.